United States Patent [19]
Edmunds

[11] Patent Number: 6,006,281
[45] Date of Patent: Dec. 21, 1999

[54] NETWORK PRINTING SYSTEM WITH DATA MERGE FEATURE

[75] Inventor: Cyril G. Edmunds, Webster, N.Y.

[73] Assignee: Xerox Corporation, Stamford, Conn.

[21] Appl. No.: 09/004,258

[22] Filed: Jan. 8, 1998

[51] Int. Cl.⁶ .................................................. G06F 13/00
[52] U.S. Cl. ................................... 710/1; 710/12; 707/1; 707/200; 707/522; 707/526
[58] Field of Search ................... 710/1, 12, 62, 710/65, 52, 56, 57, 72; 707/1, 100, 522, 523, 524, 526, 527–29, 200

[56] References Cited

U.S. PATENT DOCUMENTS

| | | | |
|---|---|---|---|
| 4,148,066 | 4/1979 | Saylor ..................................... | 358/127 |
| 4,754,428 | 6/1988 | Schultz et al. ........................... | 709/246 |
| 4,903,229 | 2/1990 | Schmidt et al. ......................... | 707/200 |
| 5,091,868 | 2/1992 | Pickens et al. .......................... | 395/148 |
| 5,524,085 | 6/1996 | Bellucco et al. ........................ | 709/248 |
| 5,805,442 | 9/1998 | Crater et al. ............................ | 364/138 |
| 5,884,014 | 3/1999 | Huttenlocher et al. ................. | 395/114 |

*Primary Examiner*—Ayaz R. Sheikh
*Assistant Examiner*—Ario Etienne
*Attorney, Agent, or Firm*—Gary B. Cohen; Philip E. Blair

[57] ABSTRACT

A printing subsystem for use in a network printing system, having a database communicating with a client browser, is provided. The database includes a plurality of data sets and the client browser includes a program with a set of instructions for displaying at least one of the plurality of data sets on a user interface display screen. The printing subsystem is disposed remotely of and communicates with both of the database and the client browser. The printing subsystem includes a marking engine and a copy of the program, the program copy receiving the at least one of the plurality of data sets for placing the same in a displayable format. An interface communicates with the program copy for converting the at least one of the plurality of data sets from the displayable format to a printable format, and a print buffer is employed to store the at least one of the plurality of data sets in the printable format in anticipation of producing a print therefrom.

13 Claims, 7 Drawing Sheets

NETWORK PRINTING SYSTEM WITH DATA MERGE FEATURE

BACKGROUND

The present invention relates to a system for merging image data into a template or form at a printer and more particularly to a network printing system in which a corresponding printer is provided with a flexible programming language in such a manner that graphic data associated with one or more forms need not be stored at or transmitted to the printer.

With the advent of the electronic office, many records or forms are maintained at a server on a network for access by those with appropriate authorization. A record, such as an invoice, can be created readily with a forms generation system of the type disclosed in U.S. Pat. No. 5,091,868 to Pickens et al. (Issued: Feb. 25, 1992). As further taught by U.S. Pat. No. 4,903,229 to Schmidt et al. (Issued: Feb. 20, 1990) a form can be filled in with appropriate data and then displayed at a suitable monitor. More particularly, data from an information data file is merged into the form of a form data file at the computer. It will be recognized, by those skilled in the art, that the computer can be disposed remotely of storage area(s) in which the form data and information data files are disposed. For example, the files could be disposed in a server remotely of a workstation at which the records or forms are to be displayed. Although disposing a workstation remotely of the storage area(s) is advantageous in that storage at the workstation is maximized, retrieving graphic data corresponding with the form data can be time consuming since the length of the data stream used to carry the form data can be significant.

The Java ("Java" is a trademark of Sun Microsystems) programming language is highly effective tool for accessing databases to display significant amounts of data in an efficient manner. One Java program contemplated for use in such access is a Java applet. As is known, the Java applet is typically included in an HTML page in much the same way that an image would be. When a Java compatible browser is employed to view a page containing a Java applet, the applet's code is transferred to the browser for execution therewith. For detailed information regarding how to include an applet in an HTML page, reference can be made to a description referred to as "APPLET.tag" on Java.Sun.Com. It is commonly recognized that a Java applet is particularly powerful in the area of browsing since it can be used to facilitate the acquisition of data for display across a wide variety of platforms.

As further indicated at Java.Sun.Com:

The following are example applets. Some run on browsers that support Java Platform 1.0, while others run on browsers that support Java Platform 1.1. Browsers that support Java Platform 1.0 include HotJava™ 1.0-prebeta1, Netscape Navigator™ 2.x(32-bit) and Internet Explorer. HotJava 1.0 supports Java Platform 1.1. Applets will also run in AppletViewer (a tool distributed in the Java Development Kit).

As is known, through use of Java applets, the length of a data stream corresponding with an electronic document can be reduced considerably since the form component of a data filled form can be generated by one or more applets, at a host browser, without actually "hauling" the graphic data, corresponding with the form, across the network. It is understood, however, that for various reasons discussed below, Java applets are not commonly used in printing records with merged data at a printer disposed remotely of the source from which the data originated. It would be desirable to provide a network printing system, having a printer, in which data could be merged into a template, with a service, in such a way that the amount of data stored at or transmitted to the printer is minimized.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181, 162, 5,220,674, 5,247,670; 4,953,080 and 4,821,107. Further by way of background, some of the following Xerox Corporation U.S. patents also include examples of networked systems with printers: 5,153,577; 5,113,517; 5,072, 412; 5,065,347; 5,008,853; 4,947,345; 4,939, 507; 4,937, 036; 4,920,481; 4,914,586; 4,899,136; 4,453,128; 4,063, 220; 4,099,024; 3,958,088; 3,920,895; and 3,597,071. Also noted are IBM Corp. U.S. Pat. Nos. 4,651,278 and 4,623, 244, and Canon U.S. Pat. No. 4,760,458 and Japan. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" ".Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, A New Personal Computer.."; "Xerox System Integration Standard Printing Protocol XSIS 118404", April 1984; "Xerox Integrated Production Publishers Solutions:.." Booklet No. "610P50807" "11/ 85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart®" systems, first announced Sept. 13, 1990, are also noted.

Current popular commercial published "systems software" including LAN workstation connections includes Novell® DOS 7.0, "Windows®" NT 3.1, and IBM OS/2 Version 2.1.

Disclosures of all of the patents cited and/or discussed above in this Background are incorporated herein by reference.

SUMMARY OF THE INVENTION

In accordance with a first aspect of the present invention there is provided a print data processing system for use in a network printing system with a database from which a first set of raw data is retrieved at a first time and a second set of raw data is retrieved at a second time. The first set of raw data is processed into a first set of printable data and written with a template for printing at a third time and the second set of raw data is processed into a second set of printable data and written with a template for printing at a fourth time. The print data processing system comprises: a set of one or more database reading objects for retrieving the first set of raw data from the database at the first time and for retrieving the second set of raw data from the database at the second time; and a set of one or more page description language (pdl) emitting objects, communicating with said set of one or more database reading objects, for writing the first set of printable data to the template at the third time and for writing the second set of printable data to the template at the third time.

In accordance with a second aspect of the present invention there is provided a printing subsystem for use in a network printing system having a database communicating with a client browser. The database includes a plurality of data sets and the client browser including a program with a set of instructions for displaying at least one of the plurality of data sets on a user interface display screen. The printing subsystem is disposed remotely of and communicates with both of the database and the client browser. The printing subsystem, which includes a marking engine, comprises: a copy of the program provided to said printing subsystem by the client browser, wherein the at least one of the plurality of data sets is communicated to said printing subsystem and placed in a displayable format with the program copy; an interface, communicating with said program copy, for converting the at least one of the plurality of data sets from the displayable format to a printable format; and a print buffer, communicating with said interface, for receiving the at least one of the plurality of data sets in the printable format, wherein a print representative of the at least one of the plurality of data sets is produced with the marking engine in response to a selected amount of data being stored in said print buffer.

DETAILED DESCRIPTION OF PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
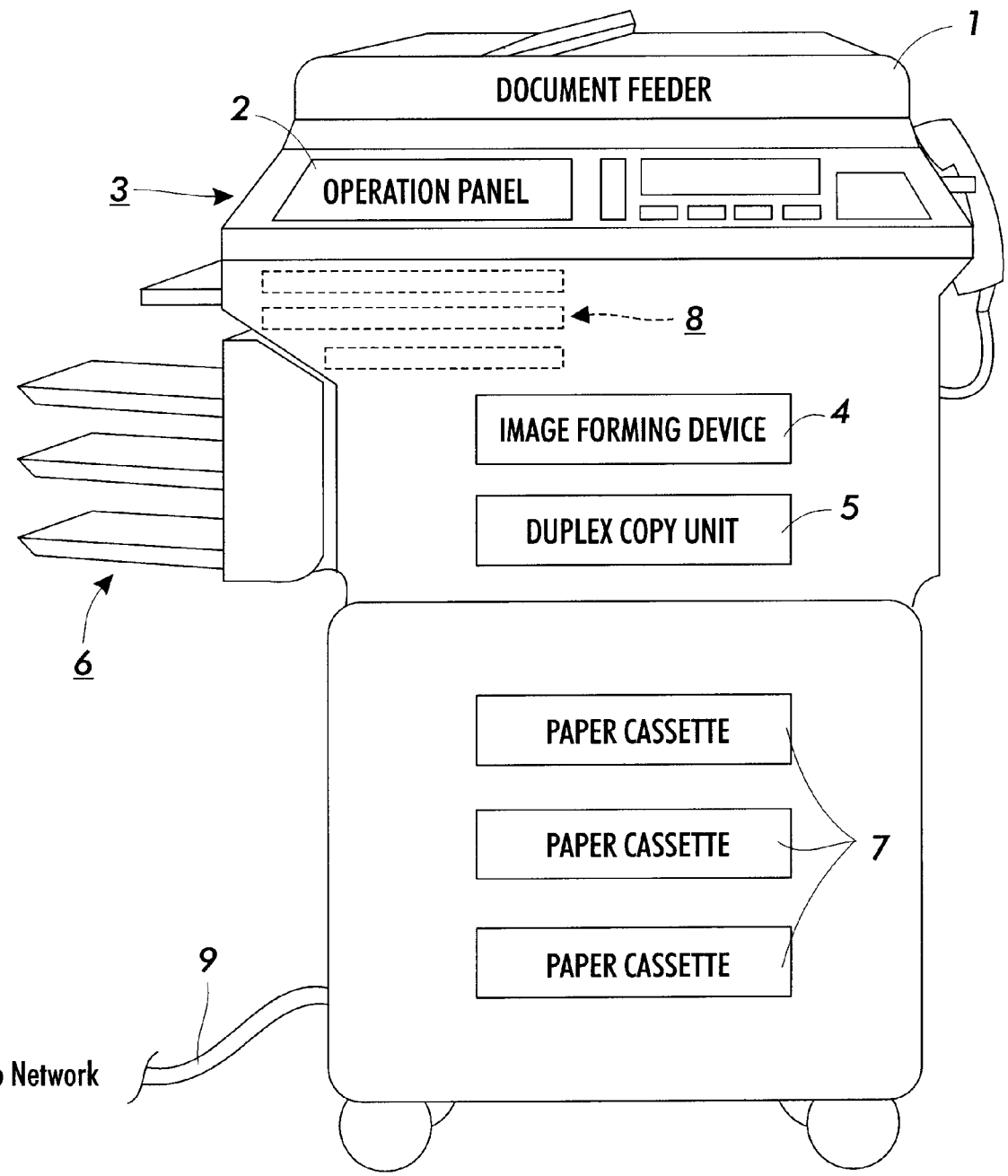
FIG. 1 a perspective view of a networked printing apparatus.

Referring to FIG. 1 of the drawings, a digital printing apparatus of the type suitable for use with the preferred embodiment is designated with the numeral 1. As shown, the system includes a document feeder 2 and an operation (and display) panel or user interface 3. After desired conditions have been entered on the operation panel 3, through the aid of a suitable display, the document feeder 2 conveys a document to a predetermined reading position on an image reading device 4 and, after the document has been read, drives it away from the reading position. The image reading device 4 illuminates the document brought to the reading position thereof. The resulting reflection from the document is transformed to a corresponding electric signal, or image signal, by a solid state imaging device, e.g., a CCD (Charge Coupled Device) image sensor. An image forming device 5 forms an image represented by the image signal on a plain paper or a thermosensitive paper by an electrophotographic, thermosensitive, heat transfer, ink jet or similar conventional system.

As a paper is fed from any one of paper cassettes 8 to the image on forming device 4, the device 4 forms an image on one side of the paper. A duplex copy unit 6 is constructed to turn over the paper carrying the image on one side thereof and again feed it to the image forming device 4. As a result, an image is formed on the other side of the paper to complete a duplex copy. The duplex copy unit 6 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 7 in order of page or page by page.

Applications, generally 9, share the document feeder 1, operation panel 2, image reading device 3, image forming device 4, duplex unit 6, output device 7, and paper cassettes 8 which are the resources built in the copier system. As will appear, the applications include a copier application, a printer (IOT) application, a facsimile (Fax) application and other applications. Additionally, the digital copier system is coupled with a network by way of a conventional network connection 11.

Figure 2:
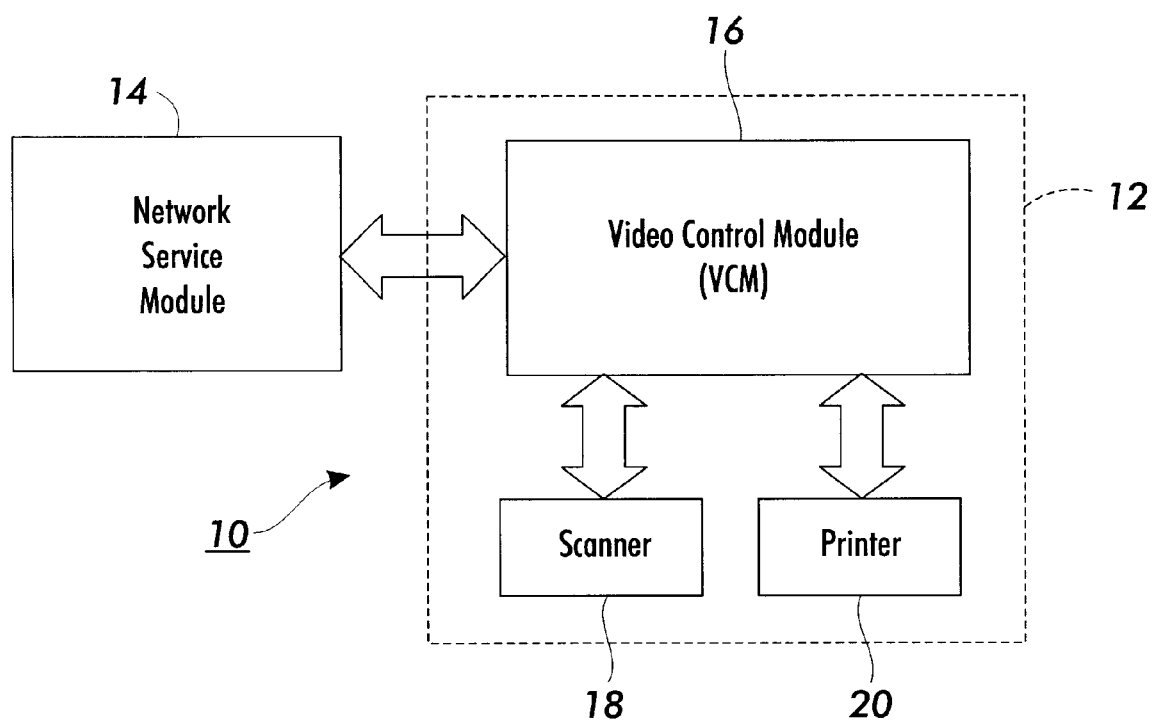
FIG. 2 is a block diagram depicting a multifunctional, network adaptive printing machine.

Referring to FIG. 2, a multifunctional, network adaptive printing system is designated by the numeral 10. The printing system 10 includes a printing machine 1 operatively coupled with a network service module 14. The printing machine 1 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring still to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
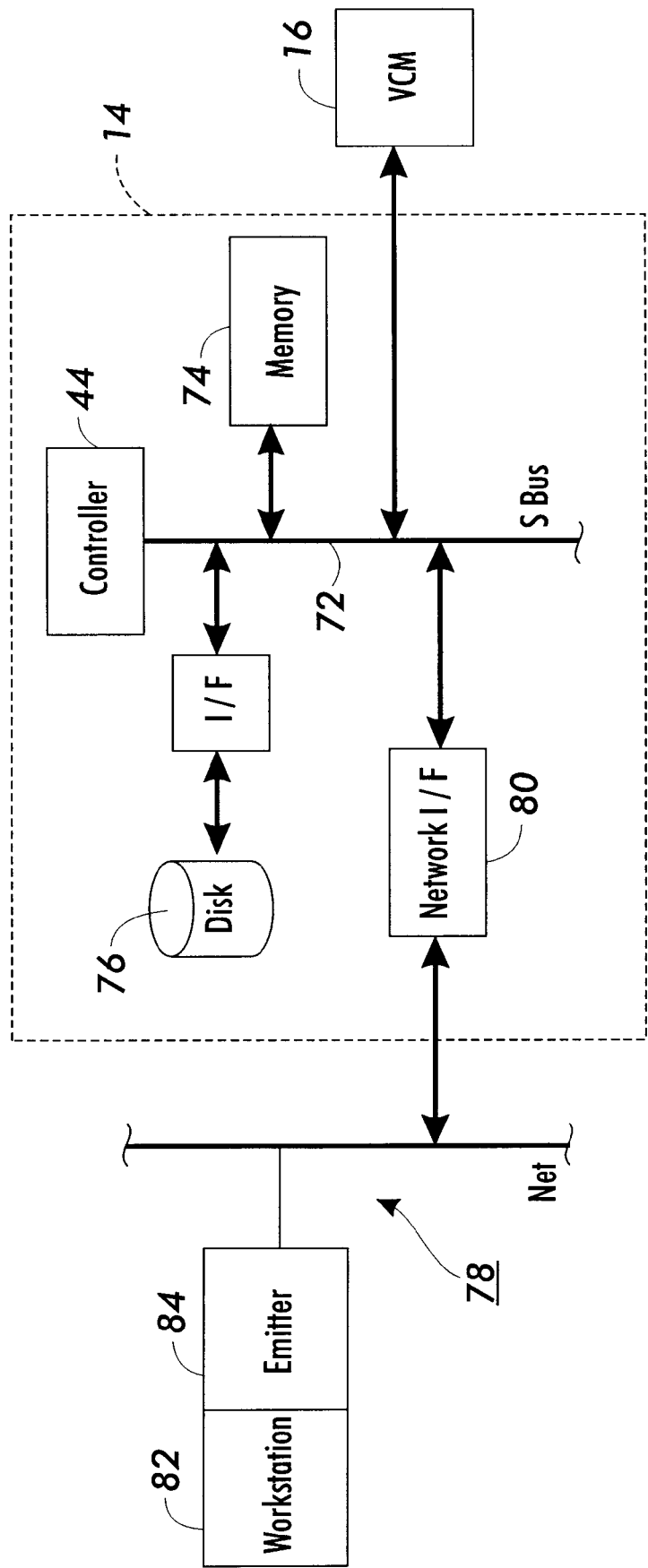
FIG. 3 is a block diagram of a network controller for the printing machine of FIG. 3.

Referring to FIG. 3, the network service module 14 is discussed in further detail. As will be recognized by those skilled in the art, the architecture of the network service module is similar to that of a known "PC clone". More particularly, in one example, a controller 24 assumes the form of a SPARC processor, manufactured by Sun Microsystems, Inc., is coupled with a standard SBus 26. In the illustrated embodiment of FIG. 3, a host memory 28, which preferably assumes the form of DRAM, and a SCSI disk drive device 30 are coupled operatively to the SBus 26. While not shown in FIG. 3, a storage or I/O device could be coupled with the SBus with a suitable interface chip. As further shown in FIG. 3, the SBus is coupled with a network 34 by way of an appropriate network interface 36. In one example, the network interface includes all of the hardware and software necessary to relate the hardware/software components of the controller 24 with the hardware/software components of the network 34. For instance, to interface various protocols between the network service module 14 and the network 34, the network interface could be provided with, among other software, Netware® from Novell Corp.

In one example, the network 34 includes a client, such as a workstation 38 with an emitter or driver 40. In operation, a user may generate a job including a plurality of electronic pages and a set of processing instructions. In turn, the job is converted, with the emitter, into a representation written in a page description language, such as PostScript. The job is then transmitted to the controller 24 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Further details regarding the implementation of a network capable printing system may be obtained by reference to U.S. Pat. No. 5,436,730 to Hube (Issued: Jul. 25, 1995), the disclosure of which is incorporated herein by reference.

Figure 4:
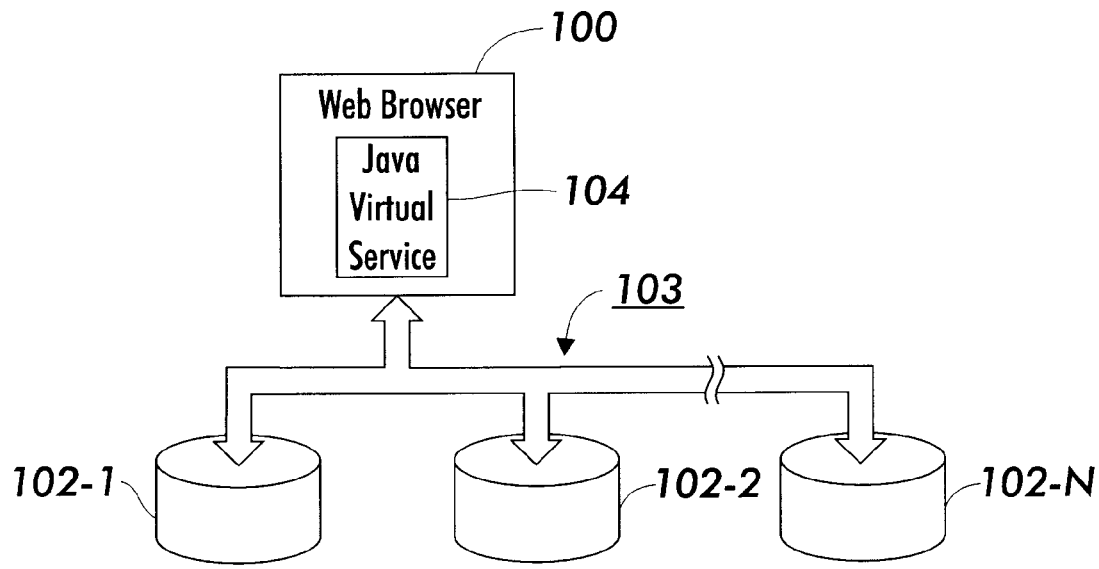
FIG. 4 is a block diagram of a prior art network processing system in which a web browser, with a Java virtual service, is used to retrieve information from multiple databases.

Referring to FIG. 4 the general theory behind Java applications or applets is explained in further detail. In the illustrated embodiment of FIG. 4, a web browser 100 is shown in communication with data bases 102-1, data base 102-2, . . . , 102-N. The web browser, which may originate from Netscape (2.01 or higher) or Microsoft (e.g. "Nashville" (a trademark of Microsoft)), communicates with the data bases 102 through a suitable network 103, such as the World Wide Web. In practice, the web browser 100 is provided with a suitable Java virtual service 104 provided by Sun Microsystems. As is known Java is a computing platform, the base upon which software developers can build a host of applications. Java applications or "applets" are different from ordinary applications in that they reside on the network in centralized servers (not shown). Typically, the network delivers an applet to a system, such as the web browser 100, upon request.

In one example, provided by Sun Microsystems on its Web Page at Java.Sun.Com, a user of the web browser 100 may check his/her personal financial portfolio by dialing into a corresponding financial institution and inducing the web browser to log into the institution's system. Portfolio data is then shifted to the user with an appropriate applet required to view the data. If the user is considering moving money from one account to another, there is no need to perform a series of cut-and-paste exercises, rather the system sends the user an applet that will allow the user to change the rate of interest and length of investment to perform a series of "what-if" scenarios.

Referring still to FIG. 4, due to the platform "neutrality" of Java applications, the data bases 102 can be located in different locations and can be associated with different computing platform types. Indeed, applications created in Java can be deployed without modification to any computing platform, thus saving the cost associated with developing software for multiple platforms. And because the applications are stored on centralized servers, there is no need to insert disks or ship CDs to update software.

Figure 5:
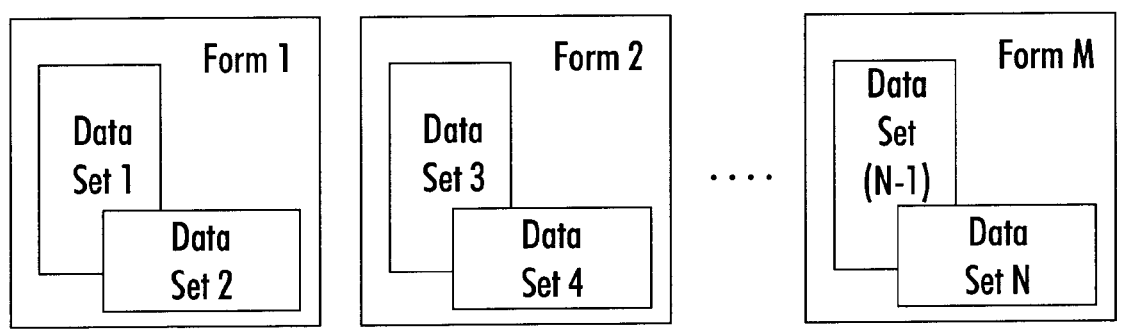
FIG. 5 is a schematic, elevational view of multiple records or forms in which multiple data sets have been merged therewith in a known manner.

Referring to FIG. 5, a problem addressed by the preferred embodiment is described in further detail. In one example a plurality of records may be maintained in one of databases 102. As shown in FIG. 5, a set of M records or forms include N data sets, and it is known that the records can be retrieved relatively quickly, for display on a UI display screen (FIG. 7), through use of the Java virtual service on the web browser 100. Printing of the records, however, can be a very time-consuming task. In particular a template for each of the records along with the corresponding data sets is transmitted to the printer as a data stream which is commonly quite long. When using Java applets to manage the data sets, the length of the data stream is minimized since the corresponding applet(s) "draws" the template each time a record is to be displayed. In other words the "baggage" of the templates need not be carried across the network.

Moreover, pointers are employed to reference data for retrieval.

It is understood, however, that Java isn't commonly used in printing since (1) there are various security issues associated with using an applet, which may include a "virus", for controlling a printing process, and processing dynamic data pursuant to the printing process can be problematic. The description below sets forth two embodiments for using Java applications in printing to minimize the amount of data which need be transmitted across the network to a target printer. As will appear, the two embodiments permit the printing of multiple records, through use of applets, in a manner that is secure, economical and efficient.

The first embodiment exploits selected aspects of a Postscript ("Postscript" is a trademark of Adobe Corp.) environment. In the Postscript environment, as it is currently envisioned, it is believed that no satisfactory approach exists for transmitting a form, which is to be filled out with variable data (e.g. a bill with the name and logo of the billing company plus a data base of client names, addresses, and account information) across a network. If a Postscript decomposer (implementable on the processor 44 of FIG. 3) recognized Java applets as a legitimate source of PostScript code, however, the Java applets could be used to implement variable date printing.

Employment of Java applets, in accordance with the first embodiment would proceed as follows:

(1) The decomposer takes a first pass through the PostScript code noting the presence of but otherwise ignoring any Java applets.

(2) Assuming not applets are found, then printing is executed in a normal fashion.

(3) If one or more applets are found, the result of the procedure thus far is to be considered a form and stored for repeated use. This emphasizes an important feature of the first embodiment, namely that fixed data need only be transmitted once.

(4) In view of the situation encountered in (3), a first document is created by consulting each applet: and asking "do you have more date for display"? If the answer is yes, the applet is asked to provide a piece of encapsulated PostScript which is added to the form in accordance with conventional PostScript rules. In one instance, the applet gets its data from a data base which might have been sent with the document. Alternatively, the data is addressed remotely through the network. It should be appreciated that the PostScript does not know or need to know anything about the data base.

(5) When the first document is complete it is printed, the form is reloaded, and the procedure returns to 4, repeating the above procedure until one or more applet reports that it is out of data.

Figure 6:
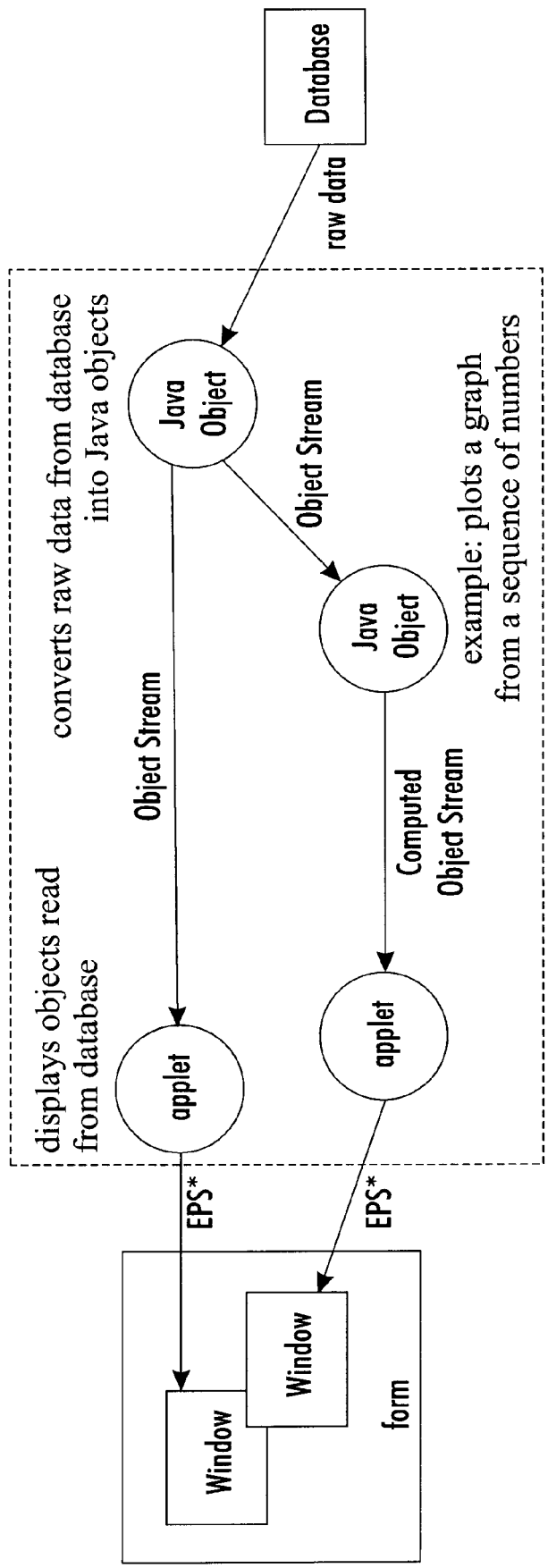
FIG. 6 is a schematic, block diagrammatic view of a printing system corresponding with a first embodiment of the present invention.

Considering the illustrated embodiment of FIG. 6 and the accompanying procedure of (1)–(5) in further detail, the Java applets would, in one example, be composed of specialized objects which read databases and others which emit PostScript.. The database reading objects can be created in view of a preexisting model, such as a conventional "mail merge" feature of the type found in available word processing applications. Communication between database reading objects and PostScript emitting objects can be achieved with a Java interface, the Java interface expressing text strings, pictures, graphic objects, or any other information appropriate for storage in the database. In addition to the above functions, Java objects could be used to perform computational functions such as plotting a graph or projecting, and/or an annuity stream could be placed between the data base readers and PostScript emitters to display things which are computable from the database.

Before proceeding, it should be noted that although the above embodiment has been discussed in the context of Java and Postscript, the basic concepts underlying the first embodiment (as well the second embodiment) would apply to a conceptual framework in which a downloadable interpreted language (e.g. Visual Basic) and/or another electronic printing environment (e.g. HPGL) is used.

Figure 7:
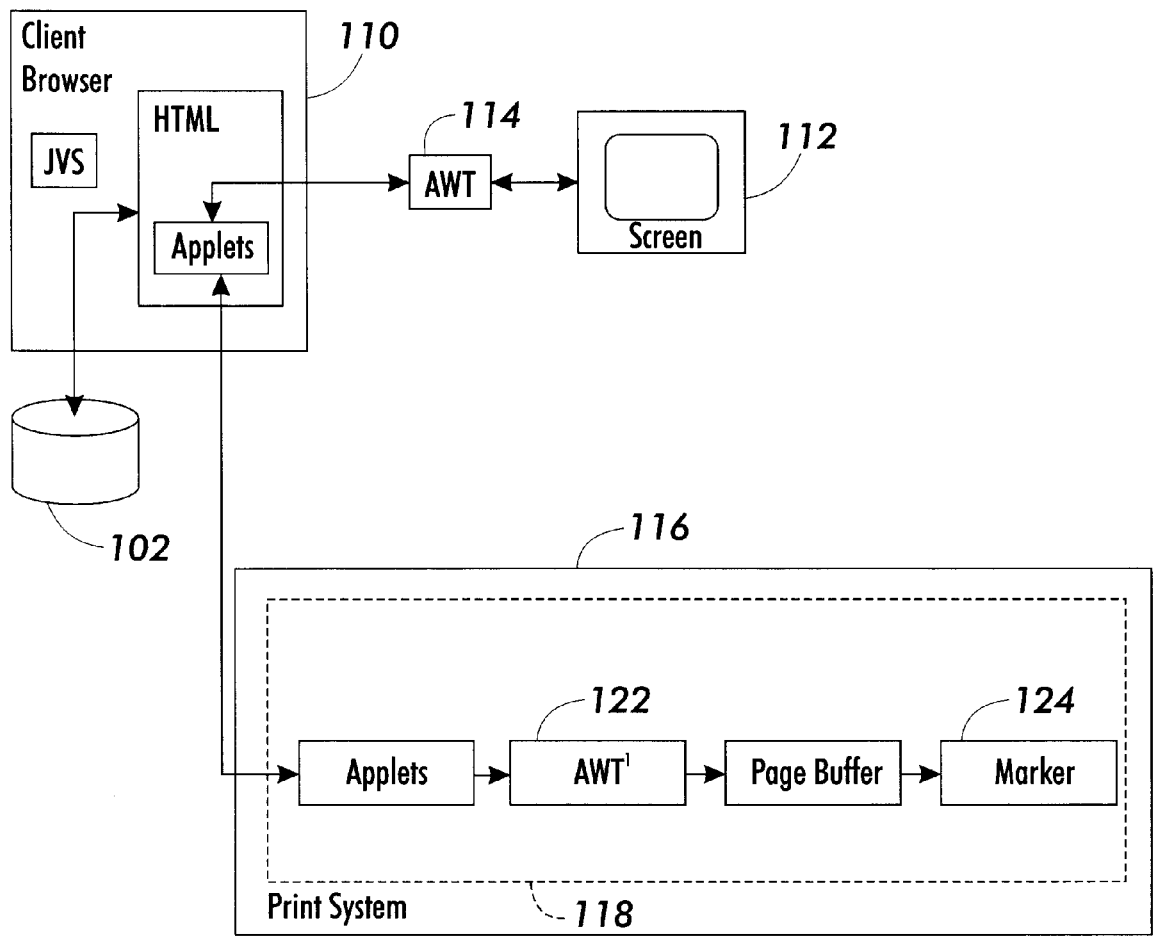
FIG. 7 is a schematic, block diagrammatic view of a printing system corresponding with a second embodiment of the present invention.

In the second embodiment, the need to use postscript for printing records is eliminated. As shown in FIG. 7, a Java applet is a Java program included in an HTML page, much as an image would be included in the page. When using a Java-compatible browser, such as client browser 110, to view a page that contains a Java applet, the applet's code is transferred to the user's system and executed by the browser. Further detailed information on how to include an applet in an HTML page can be obtained by referencing Sun Microsystem's web page having an IP address of Java.Sun.Com. In operation, a record from the database 102 is drawn on the screen 112 through use of a "Abstract Window Toolkit (AWT)" 114 from Sun Microsystems. As is known, an applet calls the AWT and in turn the AWT calls the hardware and software necessary to draw an image, such as a record with data, on the screen 112. The second embodiment operates on the underlying principal that if an applet can be used to draw a picture on a display screen, then a comparable procedure can be employed to produce a print at a print system 116.

Referring to still FIG. 7, the print system 116 (disposed remotely of the print browser 110) is provided with an application 118, which application is configured in the form of a printer browser 118. The printer browser includes a copy set of one or more applets, obtained from the client browser 110, an AWT' 122 and a bitmap assuming the form of a page buffer 124. It should be appreciate that the AWT' 122 differs in structure from AWT 114 in that the AWT' 122 is provided with the software necessary to interpolate data from a lower resolution to a higher resolution (See e.g. U.S. Pat. No. 5,553,171 to Lin et al., the disclosure of which is incorporated herein by reference. Preferably, the calls of the AWT' 122 are directed toward a mapping routine for causing interpolation of displayable data from a lower resolution, corresponding with a resolution suitable for use with a screen display, to a higher resolution corresponding with a resolution more suitable for use with a printer.

Figure 8:
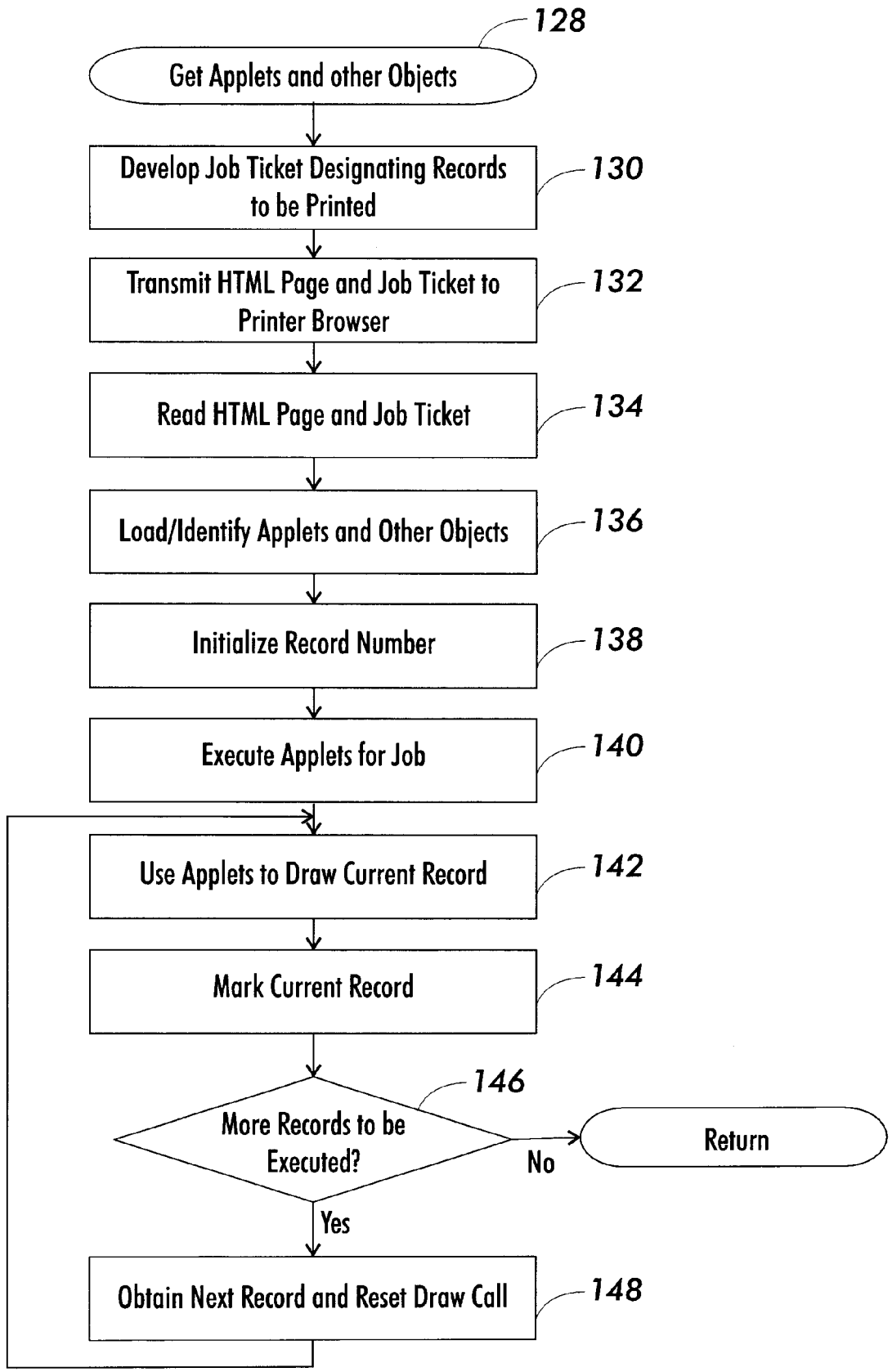
FIG. 8 is a flow diagram corresponding with a preferred mode of operation used in conjunction with the second embodiment.

Referring now to both FIGS. 7 and 8, a preferred mode of operation for the second embodiment is discussed in further detail. As should be appreciated, steps 128, 130 and 132 are executed with the client browser 110 while the other steps of the preferred mode are executed at the remote printing system 116, In practice, at step 128, a set of one or more applets, along with any other necessary object information (e.g. Java Object), is obtained. As is known, the applets and other objects are provided by way of an HTML page. Pursuant to step 128, a framework for printing records, namely a Java virtual service is created. At step 130, a job ticket is developed to designate the records which are to be displayed from one or more databases. A copy of both the job ticket and HTML page (including the applets and other Java objects) are transmitted, via step 132, from the client browser 110 to the printer browser 118.

At the printer browser, the HTML page and the job ticket are read by way of the network module 14 (FIG. 3 and step 134), and the applets/other objects are loaded in anticipation of their use in a display operation (step 136). As a result of loading/identifying the applets and other objects one or more appropriate functions are provided (e.g. "ObjectA.draw(i)" where i corresponds with a record number) and set for use by the Java virtual service in processing a job, the job including at least a first set of data to be obtained from the database 102. As will be recognized the function serves at least two purposes, namely to draw a template and facilitate insertion of data into the template.

At step 138, the first record number is initialized by reference to the job ticket and the Java virtual service is invoked, at steps 140 and 142, to process the first set of data for writing the same into the buffer 124. More particularly, the applets operate under the assumption that they are writing data onto a screen with a relatively high resolution. In one example, the applets believe they are displaying data on a screen of 300 or 600 spi. It is this displaying in conjunction with interpolation which permits the applets to "draw" a bitmap including the template and accompanying data. Once the buffer or bitmap is filled, marking of a print proceeds (step 144) so as to flush out the buffer.

In view of marking a current record, the job ticket is consulted, via step 146, to determine if any further records require printing. In one example, the job ticket may reference a following set of records:

{1, 5, 10, . . . N}

In accordance with this one example, after producing a print for record 1, the process determines (at step 146) that record 5 is now to be produced; after producing a print for record 5, the process determines that record 10 is to be produced, and so on. In view of such determination the function (or functions) which controls the drawing of the template and insertion of data is preferably reset, at step 148, for processing of the next record. This resetting can be implemented remotely with suitable preprogramming provided the printer browser is supplied with an appropriate protocol and other key heuristics, such as the identity of applets being used by the Java virtual service. That is, the identity of object classes used to implement a user interface can be determined at run time and used to mimic the conventional action of selecting interface elements, such as buttons, for displaying a next record. Currently, run time type identification is believed to be only suitable for use with specific classes for which it was programmed; however, it is contemplated that de facto standards, which will effectively make this technique completely general, will emerge.

Invocation of the applets, as contemplated by steps 140, 142, 144, 146 and 148 proceeds until N records listed by the job ticket have been printed.

Numerous features of the above-described embodiment will be appreciated by those skilled in the art.

First, the amount of data which need be stored at or transmitted to a host printer is minimized. That is, since graphic related image data corresponding with a template need not be stored at the printer, its storage "overhead" is kept to at a reasonable level. Moreover, since the graphic related data need not be transmitted to the printer, bandwidth of an associated network is maintained at a reasonable level and a datastream received at the printer is not unduly long. Shortening the datastream results in highly desirable print times.

Second, the approach of the first embodiment permits Java objects to be extended advantageously into a known printing environment without significantly altering such printing environment. For example, the approach can be used in a is Postscript RIP process in such a way as to greatly increase the speed of printing. That is, by inserting the objects into the Postscript process, the amount of time required to provide a template and merge data therein can be minimized.

Finally, when using applets to print in the second embodiment, security issues are resolved since the applets are not actually printing, but rather writing data to a "display". By using the applets in a normal function, namely in a displaying mode, the risk of contaminating the printing process with the applets is alleviated.

What is claimed is:

1. In a network printing system with a database from which a first set of raw data is retrieved at a first time and a second set of raw data is retrieved at a second time, the first set of raw data being processed with a first set of printable data and written into a template for printing at a third time and the second set of raw data being processed with a second set of printable data and written into a template for printing at a third time, a print data processing system comprising:

a set of one or more database reading objects for retrieving the first set of raw data from the database at the first time and for retrieving the second set of raw data from the database at the second time;

a set of one or more page description language (pdl) emitting objects, communicating with said set of one or more database reading objects, for writing the first set of printable data to the template at the third time and for writing the second set of printable data to the template at the third time; and an object for performing at least one computational function, said computational function performing object being disposed intermediate of said set of one or more database reading objects and said set of one or more pdl emitting objects.

2. The print data processing system of claim 1, wherein at least one of said one or more database reading objects converts raw data into an object stream.

3. The print data processing system of claim 1, wherein at least one of said one or more pdl emitting objects includes a Java applet.

4. The print data processing system of claim 3, wherein said Java applet communicates encapsulated Postscript to the template.

5. The print data processing system of claim 1, wherein said set of one or more database reading objects and said set of one or more pdl emitting objects are both part of a Java virtual service.

6. In a network printing system having a database communicating with a client browser, the database including a plurality of data sets and the client browser including a program with a set of instructions for displaying at least one of the plurality of data sets on a user interface display screen, a printing subsystem disposed remotely of and communicating with both of the database and the client browser, said printing subsystem including a marking engine and comprising:

a copy of the program which is provided to said printing subsystem by the client browser, wherein the at least one of the plurality of data sets is communicated to said printing subsystem and placed in a displayable format with the program copy;

an interface, communicating with said program copy, for converting the at least one of the plurality of data sets from the displayable format to a printable format; and a print buffer, communicating with said interface, for receiving the at least one of the plurality of data sets in the printable format, wherein a print representative of the at least one of the plurality of data sets is produced with the marking engine in response to a selected amount of data being stored in said print buffer.

7. The printing subsystem of claim 6, wherein the program comprises one or more Java applets.

8. The printing subsystem of claim 6, in which data of the at least one of the plurality of data sets in the displayable format is characterized by a first resolution and the at least one of the plurality of data sets in the printable format is characterized by a second resolution with the second resolution being greater than the first resolution, wherein said interface includes a subsystem for interpolating the data of the at least one of the plurality of data sets in the displayable format from the first resolution to the second resolution.

9. The printing subsystem of claim 6, further comprising a browser including both said program copy and said interface.

10. The printing subsystem of claim 6, further including a job ticket which both references multiple ones of the plurality of data sets and points to a first one of the multiple ones of the plurality of data sets, wherein said job ticket points to a second one of the multiple ones of the plurality of data sets in response to said producing, of the print.

11. The printing subsystem of claim 6, in which said program copy includes a call with a corresponding argument and at least a second one of the plurality of data sets is communicated to said program copy, wherein the corresponding argument varies as function of whether the at least one of the plurality of data sets or the at least second one of the plurality of data sets is being processed by said program copy.

12. A method of producing a print in a network printing system having a database communicating with a client browser, the database including a plurality of data sets and the client browser including a program with a set of instructions for displaying at least one of the plurality of data sets on a user interface display screen, wherein a printing subsystem with a marking engine is disposed remotely of and communicates with both of the database and the client browser, said method comprising:

copying the program from the client browser to the printing subsystem;

communicating at least one of the plurality of data sets to the program copy for placing the at least one of the plurality of data sets into a displayable format;

converting the at least one of the plurality of data sets from the displayable format to a printable format; and buffering the at least one of the plurality of data sets in the printable format for producing a print representative of the at least one of the plurality of data sets with the marking engine in response to a selected amount of data being stored in a print buffer.

13. The method of claim 12, in which data of the at least one of the plurality of data sets in the displayable format is characterized by a first resolution and the at least one of the plurality of data sets in the printable format is characterized by a second resolution with the second resolution being greater than the first resolution, wherein said converting includes interpolating the data of the at least one of the plurality of data sets in the displayable format from the first resolution to the second resolution.

* * * * *